United States Patent
Bhowmick et al.

(10) Patent No.: US 11,526,174 B2
(45) Date of Patent: Dec. 13, 2022

(54) METHOD AND A SYSTEM FOR HIERARCHICAL NETWORK BASED DIVERSE TRAJECTORY PROPOSAL

(71) Applicant: Tata Consultancy Services Limited, Mumbai (IN)

(72) Inventors: Brojeshwar Bhowmick, Kolkata (IN); Krishnam Madhava Krishna, Hyderabad (IN); Sriram Nochur Narayanan, Hyderabad (IN); Gourav Kumar, Hyderabad (IN); Abhay Singh, Hyderabad (IN); Siva Karthik Mustikovela, Hyderabad (IN); Saket Saurav, Hyderabad (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 342 days.

(21) Appl. No.: 16/894,411

(22) Filed: Jun. 5, 2020

(65) Prior Publication Data
US 2020/0387163 A1 Dec. 10, 2020

(30) Foreign Application Priority Data
Jun. 7, 2019 (IN) .............................. 201921022682

(51) Int. Cl.
| | |
|---|---|
| G05D 1/02 | (2020.01) |
| G05D 1/10 | (2006.01) |
| G05B 13/02 | (2006.01) |
| G05D 1/00 | (2006.01) |
| G06N 3/04 | (2006.01) |
| G06N 3/08 | (2006.01) |

(52) U.S. Cl.
CPC .......... *G05D 1/0221* (2013.01); *G05B 13/027* (2013.01); *G05D 1/0088* (2013.01);
(Continued)

(58) Field of Classification Search
CPC .. G05D 1/0221; G05D 1/0088; G05D 1/0214; G05D 1/0248; G05D 1/0255;
(Continued)

(56) References Cited

U.S. PATENT DOCUMENTS

| | | |
|---|---|---|
| 2019/0033085 A1 | 1/2019 | Ogale et al. |
| 2019/0041225 A1* | 2/2019 | Winkle .............. G01C 21/3453 |

(Continued)

OTHER PUBLICATIONS

Baumann, Predicting Ego-Vehicle Paths from Environmental Observations with a Deep Neural Network, 2018 IEEE International Conference on Robotics and Automation (ICRA) May 21-25, 2018, Brisbane, Australia (Year: 2018).*

(Continued)

*Primary Examiner* — Anne Marie Antonucci
*Assistant Examiner* — Jingli Wang
(74) *Attorney, Agent, or Firm* — Finnegan, Henderson, Farabow, Garrett & Dunner LLP

(57) ABSTRACT

The disclosure herein generally relates to the field of autonomous navigation, and, more particularly, to a diverse trajectory proposal for autonomous navigation. The embodiment discloses a hierarchical network based diverse trajectory proposal for autonomous navigation. The hierarchical 2-stage neural network architecture maps the perceived surroundings to diverse trajectories in the form of trajectory waypoints, that an autonomous navigation system can choose to navigate/traverse. The first stage of the disclosed hierarchical 2-stage Neural Network architecture is a Trajectory Proposal Network which generates a set of diverse traversable regions in an environment which can be occupied by the autonomous navigation system in the future. The second stage is a Trajectory Sampling network which predicts a fine-grained trajectory/trajectory waypoint over the diverse traversable regions proposed by Trajectory Proposal Network.

13 Claims, 6 Drawing Sheets

(52) U.S. Cl.
CPC ......... *G05D 1/0214* (2013.01); *G05D 1/0248* (2013.01); *G05D 1/0255* (2013.01); *G05D 1/101* (2013.01); *G06N 3/0445* (2013.01); *G06N 3/08* (2013.01)

(58) Field of Classification Search
CPC ...... G05D 1/10; G05B 13/027; G06N 3/0445; G06N 3/08
See application file for complete search history.

(56) References Cited

U.S. PATENT DOCUMENTS

2020/0118446 A1\* 4/2020 Saunders ............. G08G 5/0069
2022/0126864 A1\* 4/2022 Moustafa ............ B60W 60/001

OTHER PUBLICATIONS

Cui, H. et al. (Mar. 2019). "Multimodal Trajectory Predictions for Autonomous Driving using Deep Convolutional Networks," retrieved from https://arxiv.org/pdf/1809.10732.pdf. (7 pages.).

Guzman-Rivera, A. et al. (2012). "Multiple Choice Learning: Learning to Produce Multiple Structured Outputs," retrieved from https://papers.nips.cc/paper/4549-multiple-choice-learning-learning-to-produce-multiple-structured-outputs.pdf. (9 pages.).

Bansal, S. et al. (Jul. 2019), "Combining Optimal Control and Learning for Visual Navigation in Novel Environments," retrieved from https://arxiv.org/pdf/1903.02531.pdf. (18 pages.).

\* cited by examiner

METHOD AND A SYSTEM FOR HIERARCHICAL NETWORK BASED DIVERSE TRAJECTORY PROPOSAL

CROSS-REFERENCE TO RELATED APPLICATIONS AND PRIORITY

The present application claims priority from Indian provisional patent application no. 201921022682, filed on Jun. 7, 2019.

TECHNICAL FIELD

The disclosure herein generally relates to the field of autonomous navigation, and, more particularly, to a diverse trajectory proposal for autonomous navigation.

BACKGROUND

Autonomous navigation is an important feature for an autonomous navigation system such as a mobile robot or a driverless car, wherein the autonomous navigation system navigates by identifying various possible paths/trajectories—goal points that it can pursue in any given setup. For efficient autonomous navigation, the autonomous navigation system requires explorative ability to navigate, by identifying diverse paths/trajectories to multiple goal points while also perceiving its environment. Further identifying or predicting diverse trajectories has many advantages that include determination of best plan of action, rerouting alternate trajectories due to unexpected changes in environment, possibility of reaching the destination in multiple possible ways and useful in overcoming Global Positioning Systems (GPS) errors.

There are several well-known autonomous navigation techniques that are being used for predicting diverse path/trajectory based on trajectory planning techniques. The conventional trajectory planning techniques based on hypothesizing/sampling multiple goal locations followed by computation of trajectories to such candidate goal locations are mostly efficient for single trajectory prediction, however for diverse trajectory prediction it may result in increase of computation time and efforts. Further few existing trajectory planning techniques based on neural networks predict perceptual input to continuous space control actions but are not very efficient for predicting multiple trajectory proposals.

SUMMARY

Embodiments of the present disclosure present technological improvements as solutions to one or more of the above-mentioned technical problems recognized by the inventors in conventional systems. For example, in one embodiment, a method and a system for a hierarchical network based diverse trajectory proposal is provided. The hierarchical 2-stage Neural Network architecture maps the perceived surroundings to diverse trajectories in the form of trajectory waypoints, that an autonomous navigation system can choose to navigate/traverse. The first stage of the disclosed hierarchical 2-stage Neural Network architecture is a Trajectory Proposal Network which generates a set of diverse traversable regions in an environment which can be occupied by the autonomous navigation system in the future. The second stage is a Trajectory Sampling network which predicts a fine-grained trajectory/trajectory waypoint over the diverse traversable regions proposed by Trajectory Proposal Network.

In an aspect a method for a hierarchical network based diverse trajectory proposal includes diverse trajectory. The method includes receiving an input sensor data and a trajectory mask, by one or more hardware processors, wherein the input sensor data includes a plurality of sensor data received from a plurality of sensors. The method further includes pre-processing the input sensor data, by one or more hardware processors, to obtain an occupancy map based on a mapping technique. The method further includes generating, by the one or more hardware processors, a ground truth trajectory using the occupancy map and the trajectory mask based on a rapidly exploring random tree (RRT) technique. The method further includes predicting, by the one or more hardware processors, a set of diverse traversable regions for an autonomous navigation system using a trajectory proposal network (TPNet), wherein the TPNet is a Convolutional Neural Network (CNN) trained using a multiple choice learning technique based on the ground truth trajectories, where the multiple choice learning technique includes a set of loss functions. The method further includes identifying, by the one or more hardware processors, a goal point for each of the set of diverse traversable regions based on a goal identification technique, wherein the goal point is a final co-ordinate position in a current map that must be reached by the autonomous navigation system. The method further includes generating, by the one or more hardware processors, a set of ground truth waypoints for each of the set of diverse traversable regions between the goal point and a current co-ordinate position of the autonomous navigation system in the current map based on an RRT star technique. The method further includes predicting, by the one or more hardware processors, a set of trajectory waypoints for each of the set of diverse traversable regions to obtain a set of diverse trajectories based on a trajectory sampler network (TSNet), wherein the TSNet is a Convolutional Neural Network (CNN)—a Long Short Term Memory (LSTM) network trained using the set of diverse traversable regions and the set of ground truth waypoints and the set of trajectory waypoints is a set of co-ordinate positions along the set of diverse trajectories. The method further includes displaying the set of diverse trajectories along with its associated set of trajectory waypoints in the form of trajectory waypoints In another aspect, a system for a hierarchical network based diverse trajectory proposal is provided. The system is configured for receiving an input sensor data and a trajectory mask, by one or more hardware processors, wherein the input sensor data includes a plurality of sensor data received from a plurality of sensors. The system further is configured for pre-processing the input sensor data, by one or more hardware processors, to obtain an occupancy map based on a mapping technique. The system further is configured for generating, by the one or more hardware processors, a ground truth trajectory using the occupancy map and the trajectory mask based on a rapidly exploring random tree (RRT) technique. The system further is configured for predicting, by the one or more hardware processors, a set of diverse traversable regions for an autonomous navigation system using a trajectory proposal network (TPNet), wherein the TPNet is a Convolutional Neural Network (CNN) trained using a multiple choice learning technique based on the ground truth trajectories, where the multiple choice learning technique includes a set of loss functions. The system further is configured for identifying, by the one or more hardware processors, a goal point for each of the set of diverse traversable regions based on a goal identification technique, wherein the goal point is a final co-ordinate position in a current map that must be reached by the autonomous navigation system. The system further is configured for generating, by the one or more hardware processors, a set of ground truth waypoints for each of the set of diverse traversable regions between the goal point and a current co-ordinate position of the autonomous navigation system in the current map based on an RRT star technique. The system further is configured for predicting, by the one or more hardware processors, a set of trajectory waypoints for each of the set of diverse traversable regions to obtain a set of diverse trajectories based on a trajectory sampler network (TSNet), wherein the TSNet is a Convolutional Neural Network (CNN)—a Long Short Term Memory (LSTM) network trained using the set of diverse traversable regions and the set of ground truth waypoints and the set of trajectory waypoints is a set of co-ordinate positions along the set of diverse trajectories. The system further is configured for displaying the set of diverse trajectories along with its associated set of trajectory waypoints in the form of trajectory waypoints In yet another aspect, a non-transitory computer readable medium for a hierarchical network based diverse trajectory proposal is provided. The program includes receiving an input sensor data and a trajectory mask, by one or more hardware processors, wherein the input sensor data includes a plurality of sensor data received from a plurality of sensors. The program further includes pre-processing the input sensor data, by one or more hardware processors, to obtain an occupancy map based on a mapping technique. The program further includes generating, by the one or more hardware processors, a ground truth trajectory using the occupancy map and the trajectory mask based on a rapidly exploring random tree (RRT) technique. The program further includes predicting, by the one or more hardware processors, a set of diverse traversable regions for an autonomous navigation system using a trajectory proposal network (TPNet), wherein the TPNet is a Convolutional Neural Network (CNN) trained using a multiple choice learning technique based on the ground truth trajectories, where the multiple choice learning technique includes a set of loss functions. The program further includes identifying, by the one or more hardware processors, a goal point for each of the set of diverse traversable regions based on a goal identification technique, wherein the goal point is a final co-ordinate position in a current map that must be reached by the autonomous navigation system. The program further includes generating, by the one or more hardware processors, a set of ground truth waypoints for each of the set of diverse traversable regions between the goal point and a current co-ordinate position of the autonomous navigation system in the current map based on an RRT star technique. The program further includes predicting, by the one or more hardware processors, a set of trajectory waypoints for each of the set of diverse traversable regions to obtain a set of diverse trajectories based on a trajectory sampler network (TSNet), wherein the TSNet is a Convolutional Neural Network (CNN)—a Long Short Term Memory (LSTM) network trained using the set of diverse traversable regions and the set of ground truth waypoints and the set of trajectory waypoints is a set of co-ordinate positions along the set of diverse trajectories. The program further includes displaying the set of diverse trajectories along with its associated set of trajectory waypoints in the form of trajectory waypoints It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
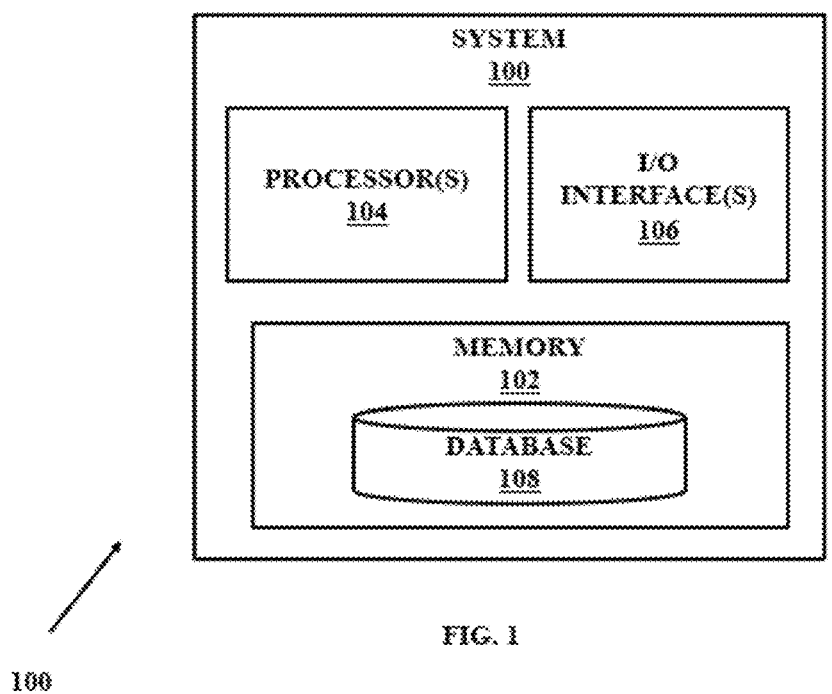
FIG. 1 illustrates a functional block diagram of an exemplary system for hierarchical network based diverse trajectory proposal according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiment discloses a hierarchical network based diverse trajectory proposal for autonomous navigation. The hierarchical 2-stage Neural Network architecture maps the perceived surroundings to diverse trajectories in the form of trajectory waypoints, that an autonomous navigation system can choose to navigate/traverse. The first stage of the disclosed hierarchical 2-stage Neural Network architecture is a Trajectory Proposal Network which generates a set of diverse traversable regions in an environment which can be occupied by the autonomous navigation system in the future. The second stage is a Trajectory Sampling network which predicts a fine-grained trajectory/trajectory waypoint over the diverse traversable regions proposed by Trajectory Proposal Network.

Referring now to the drawings, and more particularly to FIG. 1 through FIG. 4B where similar reference characters denote corresponding features consistently throughout the figures, there are shown preferred embodiments and these embodiments are described in the context of the following exemplary system and/or method.

FIG. 1 is a functional block diagram of a system 100 for a hierarchical network based diverse trajectory proposal, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 may include a database 108, which may store the dictionary, the vocabulary embedding matrix, the frequency vectors, the frequency matrix and the like. Thus, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of system 100 are explained in conjunction with functional overview of the system 100 in FIG. 2 and flow diagram of FIGS. 3A and 3XB for document embedding to obtain average embeddings for documents.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 2:
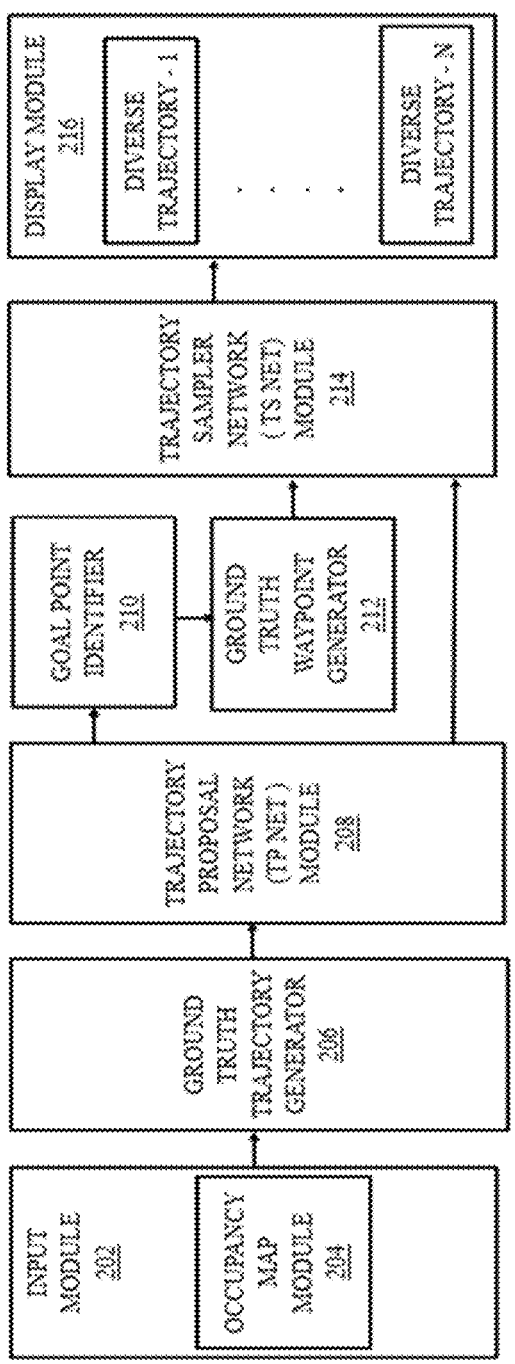
FIG. 2 is a functional block diagram for FIG. 1 according to some embodiments of the present disclosure.

FIG. 2 is a functional block diagram of the system of FIG. 1, in accordance with some embodiments of the present disclosure. As depicted in the architecture, the FIG. 2 illustrates the functions of the components of the system (100) that includes a hierarchical network based diverse trajectory proposal. The system (100) for hierarchical network based diverse trajectory proposal comprises an input module 202 configured for receiving an input sensor data and a trajectory mask, by one or more hardware processors, wherein the input sensor data includes a plurality of sensor data received from a plurality of sensors.

In an embodiment, the plurality of sensors includes a laser scanner, a sonar and a multi-camera system. Further the trajectory mask (Q) is a set of grid cells occupied during a navigation track history of a plurality of autonomous navigation systems.

According to an embodiment of the disclosure, the system 100 for hierarchical network based diverse trajectory proposal further comprises an occupancy map module 204 in the input module 202 configured for pre-processing the input sensor data, by one or more hardware processors, to obtain an occupancy map based on a mapping technique.

In an embodiment, the occupancy map is an intermediate representation of the sensor data that includes a set of occupied space, free space and unknown/unexplored space. In an example, the occupancy map is processed to obtain binary masks that would be used for neural network training purpose, wherein the processed occupancy map is composed of three mutually exclusive binary masks representing a set of occupied space ($O^1$), a set of free space ($O^2$) and a set of unknown/unexplored space ($O^3$). In a use case example, the input sensor data and the trajectory mask represented as binary masks is illustrated in the FIG. 4A.

In an embodiment, the mapping techniques are based on a discrete 2D occupancy grid map technique and a discrete occupancy grid map based on a discretization bayesian map, a dempster-shafer map and a fuzzy map.

According to an embodiment of the disclosure, the system 100 for hierarchical network based diverse trajectory proposal further comprises a ground truth trajectory generator 206 configured for generating, by the one or more hardware processors, a ground truth trajectory using the occupancy map and the trajectory mask based on a rapidly exploring random tree (RRT) technique.

According to an embodiment of the disclosure, the system 100 for hierarchical network based diverse trajectory proposal further comprises a Trajectory proposal network (TPNet) module 208 configured for predicting, by the one or more hardware processors, a set of diverse traversable regions for an autonomous navigation system using a trajectory proposal network (TPNet). The TPNet is a Convolutional Neural Network (CNN) trained based on a multiple choice learning technique and uses the ground truth trajectories, where the multiple choice learning technique includes a set of loss functions.

In an embodiment, the set of loss functions for the multiple choice learning technique includes a trajectory diversity loss ($L_{td}$) and an obstacle avoidance loss ($L_{obs}$). The trajectory diversity loss ($L_{td}$) enables the TPNet to predict diverse set of traversable regions and is computed based on a weighted entropy loss between the ground truth trajectory and the associated trajectory output. The obstacle avoidance loss ($L_{obs}$) penalizes the TPNet for every traversable region prediction that intersects with an obstacle and is predicted by minimizing a negative log likelihood of a trajectories at an obstacle location.

According to an embodiment of the disclosure, the system 100 for hierarchical network based diverse trajectory proposal further comprises a goal point identifier 210 configured for identifying, by the one or more hardware processors, a goal point for each of the set of diverse traversable regions based on a goal identification technique. The goal point is a final co-ordinate position in a current map that must be reached by the autonomous navigation system, wherein the autonomous navigation system includes a robot, a self-driven car and a drone.

In an embodiment, the goal identification technique identifies a highest probability co-ordinate position in a diverse traversable region that is greater than a pre-defined threshold and farthest from the autonomous navigation system's current co-ordinate position.

According to an embodiment of the disclosure, the system 100 for hierarchical network based diverse trajectory proposal further comprises a ground truth waypoints generator 212 configured for generating, by the one or more hardware processors, a set of ground truth waypoints for each of the set of diverse traversable regions between the goal point and a current co-ordinate position of the autonomous navigation system in the current map based on an RRT star technique.

According to an embodiment of the disclosure, the system 100 for hierarchical network based diverse trajectory proposal further comprises a trajectory sampler network (TSNet) module 214 configured for predicting, by the one or more hardware processors, a set of trajectory waypoints for each of the set of diverse traversable regions to obtain a set of diverse trajectories based on a trajectory sampler network (TSNet). The TSNet is a Convolutional Neural Network (CNN)—a Long Short Term Memory (LSTM) network trained using the set of diverse traversable regions and the set of ground truth waypoints and the set of trajectory waypoints is a set of co-ordinate positions along the set of diverse trajectories.

According to an embodiment of the disclosure, the system 100 for hierarchical network based diverse trajectory proposal further comprises a display module 216 configured for displaying the set of diverse trajectories along with its associated set of trajectory waypoints.

The various modules of the system 100 for a hierarchical network based diverse trajectory proposal are implemented as at least one of a logically self-contained part of a software program, a self-contained hardware component, and/or a self-contained hardware component with a logically self-contained part of a software program embedded into each of the hardware component that when executed perform the above method described herein.

Figure 3A:
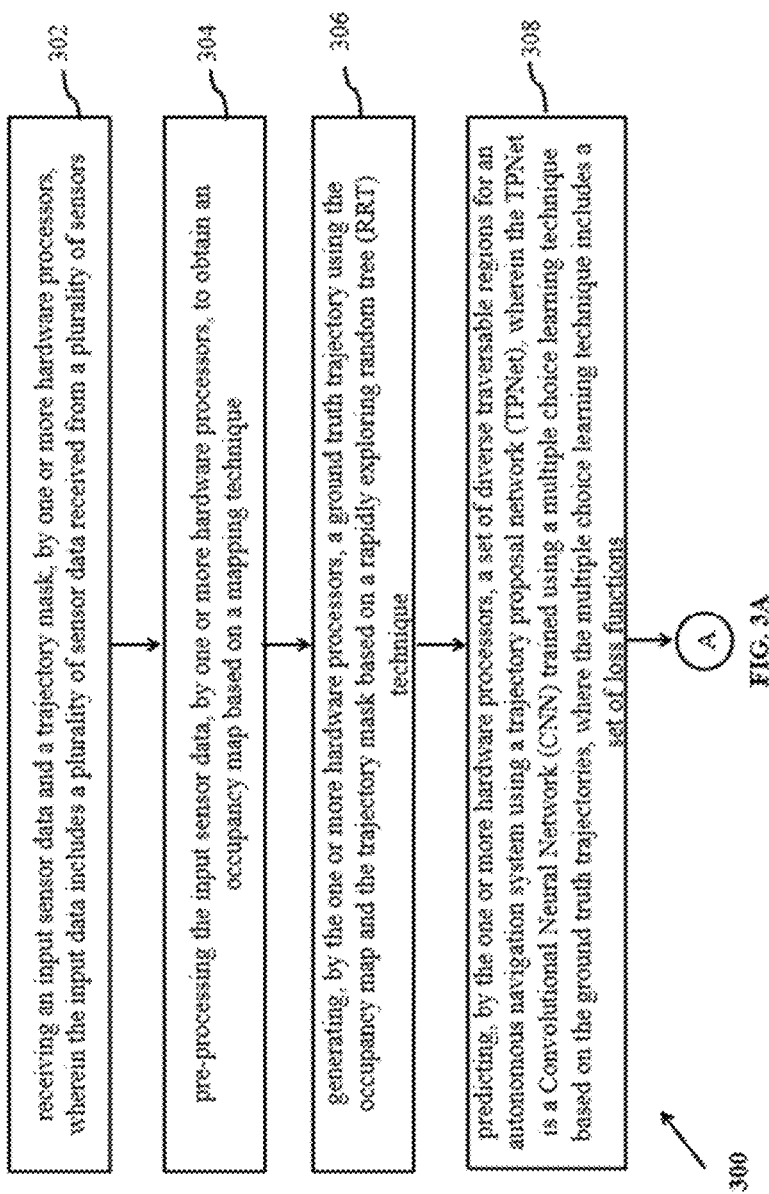
FIG. 3A and FIG. 3B is a flow diagram illustrating a method for hierarchical network based diverse trajectory proposal. in accordance with some embodiments of the present disclosure.
Figure 3B:
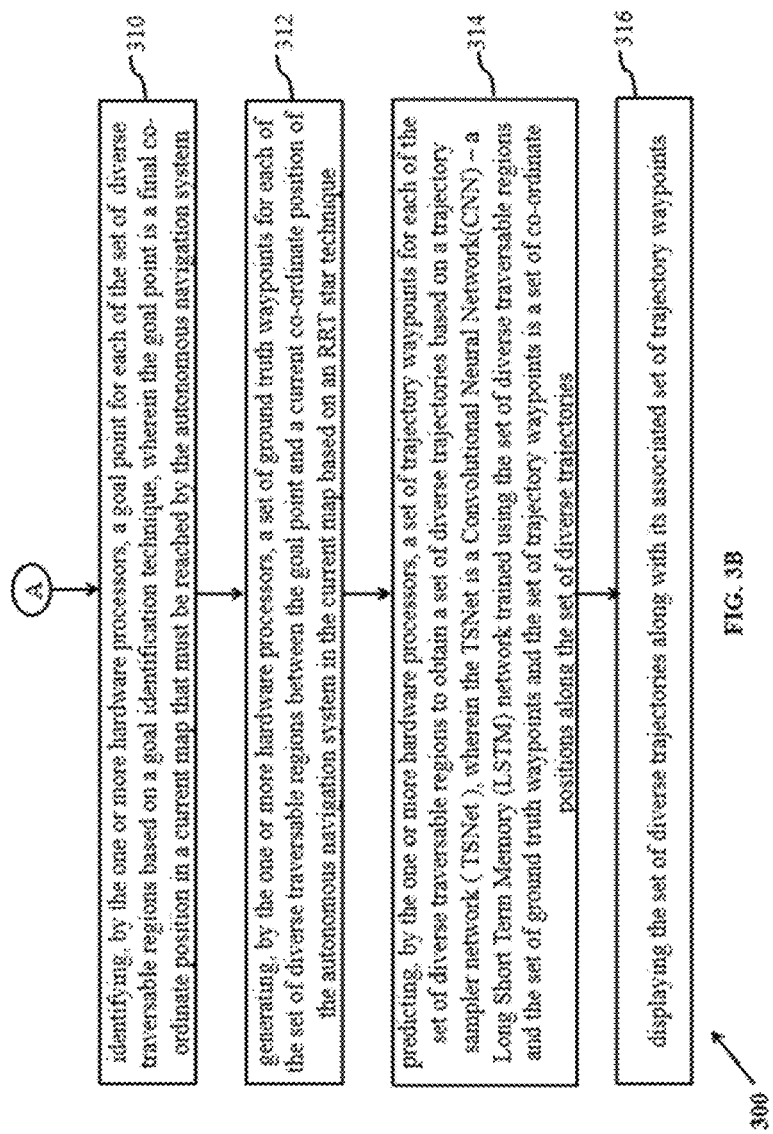

Functions of the components of the system 100 are explained in conjunction with functional modules of the system 100 stored in the memory 130 and further explained in conjunction with flow diagram of FIGS. 3A and 3B. The FIG. 3A and FIG. 3B, with reference to FIG. 1, is an exemplary flow diagram illustrating a method (300) for using the system 100 of FIG. 1 according to an embodiment of the present disclosure.

The steps of the method of the present disclosure will now be explained with reference to the components of the hierarchical network based diverse trajectory proposal system (100) and the modules (202-216) as depicted in FIG. 2 and the flow diagrams as depicted in FIG. 3A and FIG. 3B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method (300), the one or more hardware processors are configured for receiving an input sensor data and a trajectory mask, by one or more hardware processors, wherein the input sensor data includes a plurality of sensor data received from a plurality of sensors In an embodiment, the plurality of sensors includes a laser scanner, a sonar and a multi-camera system. Further the trajectory mask (Q) is a set of grid cells occupied during a navigation track history of a plurality of autonomous navigation systems.

At step 304 of the method (300), the one or more hardware processors are configured for pre-processing the input data to obtain an occupancy map based on a mapping technique in the occupancy map module 204 in the input module 202.

In an embodiment, the mapping techniques are based on a discrete 2D occupancy grid map technique and a discrete occupancy grid map based on a discretization sayesian map, a sempster-shafer map and a fuzzy map. Considering an example scenario, the occupancy map (O) is an intermediate representation of the sensor data that includes a set of occupied space ($O^1$), a set of free space ($O^2$) and a set of unknown/unexplored space ($O^3$), which can be represented as shown below:

$$O=\{O^1,O^2,O^3\} \quad (1)$$

Where
O represents network occupancy maps
$O^1$ represents occupied space
$O^2$ represents freespace
$O^3$ represents unknown/unexplored space
O is stack of mutually exclusive binary masks $O^1$, $O^2$, $O^3$, each of dimensions h*w and is obtained by projecting registered point cloud data to 2D grid in birds-eye view, hence $(O_{xy}^{j\neq i}=0)\forall(x,y)\varepsilon(h*w)$. Further second input type $Q_{h*w*1}$ specifies the track history of an autonomous navigation system in the form of grid with $Q_{xy}$ representing if a $xy^{th}$ grid cell was occupied by the ego vehicle in the past. Further effectively, the input to the network is type $I_{h*w*4}=\{O, Q\}$ where I has egocentric vehicle information. The autonomous navigation system's histories are appropriately transformed to the autonomous navigation system coordinate frame and then discretized to form a grid.

At step 306 of the method (300), the one or more hardware processors are configured for generating a ground truth trajectory in the ground truth trajectory generator 206 using the occupancy map based on a rapidly exploring random tree (RRT) technique.

In an embodiment, an rapidly exploring random tree (RRTstar) based planner from Open Motion Planning Library (OMPL) is used for generating the ground truth trajectory, wherein for each of the training scenario in $I_{train}$, multiple goal points are chosen in a manner that it ensures all dominant choices of motion. Further, trajectories are obtained to each of the goal points using RRTstar and discretized over a grid, which is as shown below;

$$I_t \in I_{train}, P_t=\{P_i\} \quad (2)$$

where
i varies from 1 to N corresponding to each scene
$I_t$ represents one of the input based on the occupancy map(O) and trajectory history(Q) of a scenario in the training set ($I_{train}$)
$_{train}$ represents the set of all the input scenarios for training the TPnet
$P_i$ represents one of the ground truth trajectories
$P_t$ represents the set of all the ground truth trajectories possible for a particular scenario.

At step 308 of the method (300), the one or more hardware processors are configured for predicting a set of diverse traversable regions for an autonomous navigation system using a trajectory proposal network (TPNet) in the TP net module 208. The TPNet is a Convolutional Neural Network (CNN) trained using a multiple choice learning technique based on the ground truth trajectories, where the multiple choice learning technique includes a set of loss functions.

In an embodiment, the set of loss functions for the multiple choice learning technique includes a trajectory diversity loss ($L_{td}$) and a obstacle avoidance loss ($L_{obs}$). The trajectory diversity loss ($L_{td}$) enables the TPNet to predict diverse set of traversable regions and is computed based on a weighted entropy loss between the ground truth trajectory and the associated trajectory output. The obstacle avoidance loss ($L_{obs}$) penalizes the TPNet for every traversable region prediction that intersects with an obstacle and is predicted by minimizing a negative log likelihood of a trajectories at an obstacle location.

In an embodiment, the CNN is used with an Encoder-Decoder style architecture with skip connections, where all the convolutions in the network are dilated. Further the output (R) of the CNN can be dynamically estimated as shown below;

$$R = R_k \quad (3)$$

where, k is the number of diverse regions to be predicted for CNN.

$R_k$ has two channels that indicate the probability of each pixel in the channel belonging to traversable region or not. Hence effectively, in an embodiment, the network has k*2 channels, hence k is 4, that is illustrated as a use case example for the CNN based TP-Net is illustrated in the FIG. 4A, In an embodiment, the CNN-TPNet is trained in a supervised fashion using <$I_t$, $P_t$> pairs, wherein for each training iteration, a random value of $I_t$ is selected from one of the ground truth trajectory $P_t$ from the pool $P_i$ and the effective loss to train TPNet is given as follows;

$$L_{TPN} = L_{td} + \lambda L_{obs} \quad (4)$$

where,

λ is the weight of Obstacle Avoidance loss.

$L_{td}$ is Trajectory Diversity Loss that can be estimated as shown below;

$$L_{td} = {}_k^{min}(-\alpha P_i^0 \log R_k^0 - (1-\alpha) P_i^1 \log R_k^1) \quad (5)$$

$L_{obs}$ is Obstacle Avoidance loss that can be estimated as shown below;

$$L_{obs} = -O^1 \log R_k^1 \quad (6)$$

The Trajectory Diversity Loss, which is estimated based on Multiple Choice Learning framework optimizes the CNN to predict diverse proposals through its outputR, wherein to compute this, a weighted cross entropy loss between each of the trajectory outputs $R_k$ in R is evaluated with the ground truth trajectory $P_i$ to choose the minimum of these losses, which is the best possible proposal generated, where α is weight parameter used to compute the loss and the superscripts 0 and 1 indicates channels corresponding to traversable and non-traversable regions of TPNet outputs. Further the CNN is trained by deep supervision by computing the Trajectory Diversity Loss at two different levels, wherein the first level as described above is at the last layer of the TPNet and the second level is immediately after the last decoder layer of the network, wherein output from the last decoder layer and de-convolutions on those features are applied to produce k*2 outputs similar to the final layer of proposed CNN. Further the loss at this intermediate supervision is same as Ltd but is applied on these intermediate outputs.

At step 310 of the method (300), the one or more hardware processors are configured for identifying a goal point for each of the set of diverse traversable regions based on a goal identification technique in the goal point identifier 210. The goal point is a final co-ordinate position in a current map that must be reached by the autonomous navigation system, wherein the autonomous navigation system includes a robot, a self-driven car and a drone.

In an embodiment, the goal identification technique identifies a highest probability co-ordinate position in a diverse traversable region that is greater than a pre-defined threshold and farthest from the autonomous navigation system's current co-ordinate position.

In an embodiment, the predefined threshold is computed by running the trained TSNet on a test data set and can be expressed as shown below:

$$\frac{1}{N}\left[\sum_{i=1}^{N}(P_{max}^i - P_{min}^i)/2\right] \quad (7)$$

Where

N is the total number of data samples in the test set and i is the data sample index.

$P_{max}^i$ is the maximum probability value in the region prediction output of $i^{th}$ sample.

$P_{min}^i$ is the minimum probability value in the region prediction output of $i^{th}$ sample.

At step 312 of the method (300), the one or more hardware processors are configured for generating a set of ground truth waypoints for each of the set of diverse traversable regions between the goal point and a current co-ordinate position of the autonomous navigation system in the current map based on an RRT star technique in the ground truth waypoints generator 212.

In an embodiment, a rapidly exploring random tree (RRT-star) based planner from Open Motion Planning Library (OMPL) is used for generating the ground truth waypoints, wherein for each of the training scenario in the diverse navigable region (R), a goal point is chosen in a manner that the goal point is a co-ordinate position in a diverse traversable region that is greater than a pre-defined threshold and farthest from the autonomous navigation system's current co-ordinate position. Further, trajectories are obtained to each of the goal point using RRTstar is discretized over a grid At step 314 of the method (300), the one or more hardware processors are configured for predicting a set of trajectory waypoints for each of the set of diverse traversable regions to obtain a set of diverse trajectories based on a trajectory sampler network (TSNet) in the TSNet module 214. The TSNet is a Convolutional Neural Network (CNN)—a Long Short Term Memory (LSTM) network trained using the set of diverse traversable regions and the set of ground truth waypoints and the set of trajectory waypoints is a set of co-ordinate positions along the set of diverse trajectories.

Figure 4A:
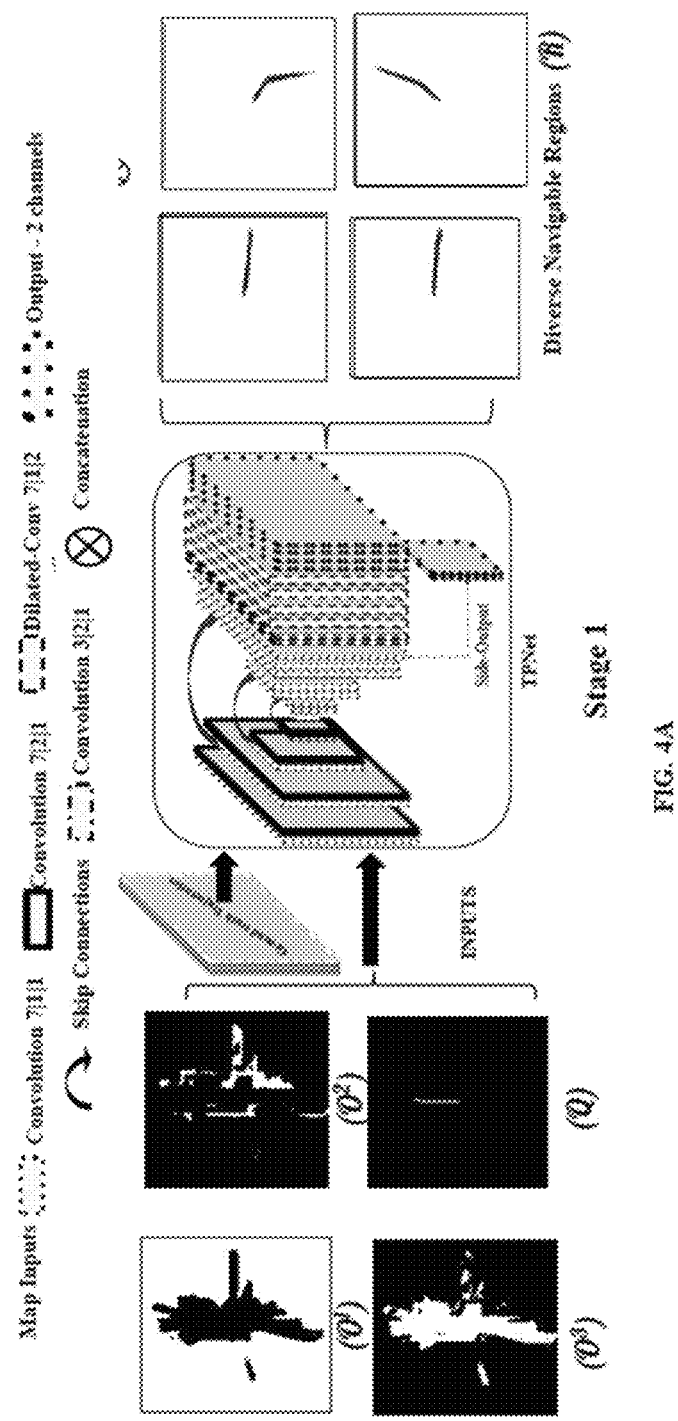
FIG. 4A and FIG. 4B illustrates a use case example block diagram of the exemplary system for hierarchical network (Trajectory Proposal Network and Trajectory Sampling Network) for diverse trajectory proposal according to some embodiments of the present disclosure.
Figure 4B:
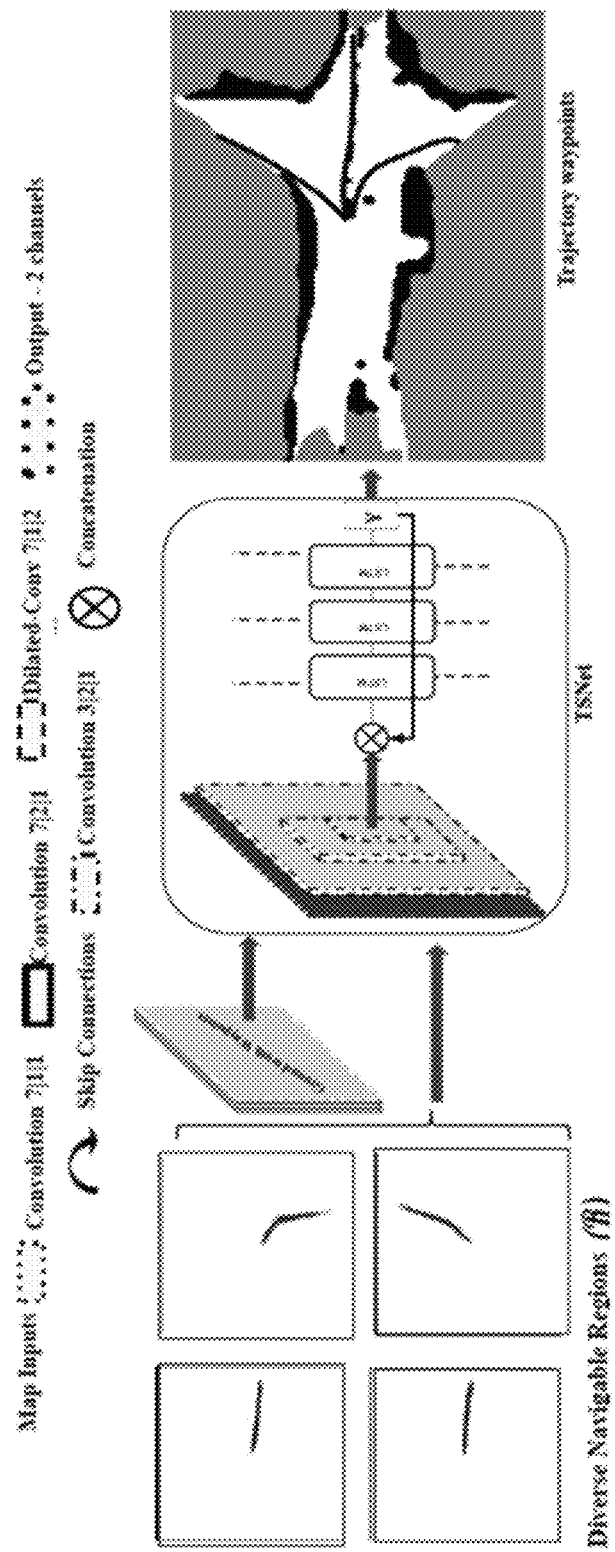

In an embodiment, the proposed CNN-LSTM comprises three layers along with the previous predicted coordinates from the previous CNN-LSTM layer, wherein a probability map is encoded into a feature space using a convolutional layer with kernel size of 7 followed by 3 convolutional layers of stride 2, as shown in FIG. 4B. The output from the proposed CNN-LSTM is represented as follows;

$$\hat{W} = \{\hat{w_1}, \hat{w_2}, \ldots, \hat{w_t}\} \quad (8)$$

where $\hat{w_t}$ is a predicted trajectory co-ordinate

The co-ordinate positions are predicted in the discretized 2-D grid representing the scene/environment. The ground truth coordinates are generated based on an RRT star with B-spline on top for each $R_k$ from the current location of the system to a point with highest probability greater than a threshold and farthest from the system location as the goal point also ensuring eventual RRTstar trajectory lies within the trajectory proposal region output by the TPNet module 208. Further the output from the TSnet is supervised by the ground truth coordinates $W=<w_1, w_2 \ldots, w_t>$ and the TSNet module 214 is trained in a supervised fashion using $<w, \hat{w}>$. Further a loss function is defined as the L2 distance between the predicted and ground truth waypoint at each LSTM prediction, which is represented as shown below;

$$L_{TSN} = \|W - \hat{W}\| \quad (9)$$

During test phase, each proposal $R_k$ from the TPNet module 208 is used by the TSNet module 114 $k$ to generate diverse future trajectories for the robot.

At step 316 of the method (300), the one or more hardware processors are configured for displaying the set of diverse trajectories along with its associated set of trajectory waypoints in the display module 216. In an embodiment, the set of diverse trajectories include diverse trajectory-1 till diverse trajectory-N.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the problem of prediction of diverse trajectories. The embodiment discloses a hierarchical network based diverse trajectory proposal for autonomous navigation. The hierarchical 2-stage Neural Network architecture maps the perceived surroundings to diverse trajectories along with trajectory waypoints, that an autonomous navigation system can choose to navigate/traverse. The first stage of the disclosed hierarchical 2-stage Neural Network architecture is a Trajectory Proposal Network which generates a set of diverse traversable regions in an environment which can be occupied by the autonomous navigation system in the future. The second stage is a Trajectory Sampling network which predicts a fine-grained trajectory/trajectory waypoint over the diverse traversable regions proposed by Trajectory Proposal Network.

Experimental Results:

The experimental results for predicting diverse trajectory proposals based on disclosed hierarchical network (TPNet and TSNet) have been shared in this section. The experiment was conducted for existing state-of-the-art planning algorithms that include RRTstar, Informed-RRTstar and BITstar based on total time taken to predict same number of paths and path length given the same goal points and closest distance of the predicted path to any obstacles in the map. Further different optimization objectives for these planners such as Threshold-Path Length (T-PL) and Path-Length (PL), and exhibit the trade-off between time to predict a path and the path length has also been considered. These results are presented in Table 1 and Table 2 as shown below;

TABLE 1

Compute time (in secs) for state-of-the-art planning algorithms and the disclosed method for predicting four diverse trajectories proposals over various datasets

| Datasets | TPNet + TSNet | TPNet + RRTstar | RRTstar T-PL | Informed-RRTstar T-PL | BITstar T-PL |
|---|---|---|---|---|---|
| KITTI | 0.079 | 0.218 | 0.297 | 0.306 | 0.294 |
| IIIT-H | 0.082 | 0.112 | 0.192 | 0.202 | 0.190 |
| Drone | 0.079 | 0.090 | 0.147 | 0.141 | 0.139 |

TABLE 2

Path length comparison (in meters) of diverse trajectories proposals between various planning algorithms for the same scene and goal points The proposed disclosed approach has been conducted on standard datasets (KITTI dataset, drone) as well IIIT-H University dataset.

| Datasets | TPNet + TSNet | RRTstar | | | Informed-RRTstar | | | BITstar | | |
|---|---|---|---|---|---|---|---|---|---|---|
| | | T-PL | PL(2sec) | PL(5sec) | T-PL | PL(2sec) | PL(5sec) | T-PL | PL(2sec) | PL(5sec) |
| KITTI | 26.079 | 26.760 | 26.121 | 26.095 | 26.727 | 26.102 | 26.075 | 26.520 | 26.177 | 26.160 |
| IIIT-H | 24.756 | 27.427 | 24.896 | 24.757 | 27.375 | 24.803 | 24.727 | 26.239 | 24.941 | 24.813 |
| Drone | 2.549 | 2.540 | 2.539 | 2.539 | 2.542 | 2.539 | 2.536 | 2.539 | 2.539 | 2.539 |

The table 1 shows the comparison of computation time for various algorithms such as RRTstar, Informed-RRTstar, BITstar and TPNet+RRTstar with the disclosed method (TPNet and TSNet). The values shown in the tables are the average of outputs on 1000 samples from each dataset. Based on the experimental results its evident that disclosed method consumes less time comparatively and is almost constant for various scenes.

The table 2 shows the trade-off between computing the optimal trajectory and the time taken to compute it. The table 2 represents the average path length to the goal in each of the evaluated datasets. Based on the experimental results its evident that the average path length reduces with increase in the max time limit for existing state of art techniques, while the disclosed method (TPNet and TSNet) framework takes 79 milli seconds to compute an optimal path length, It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. A processor-implemented method for a hierarchical network based diverse trajectory proposal for a plurality of autonomous navigation systems, comprising:
receiving input sensor data and a trajectory mask, by one or more hardware processors, wherein
the input sensor data is received from a plurality of sensors, and
the trajectory mask is a set of grid cells occupied during a navigation track history of the plurality of autonomous navigation systems;
pre-processing the input sensor data, by one or more hardware processors, to obtain an occupancy map based on a mapping technique, wherein
the mapping technique is based on a discrete 2D occupancy grid map technique,
the occupancy map is an intermediate representation of the input sensor data, and
the pre-processing further includes:
transforming a history of an autonomous navigation system of the plurality of autonomous navigation system to an autonomous navigation system coordinate frame; and
discretizing the autonomous navigation system coordinate frame to form a grid;
processing the occupancy map to obtain a plurality of binary masks, wherein
the obtained plurality of binary masks is suitable for training a Convolution Neural Network (CNN),
the processed occupancy map includes at least three mutually exclusive binary masks of the plurality of binary masks;
generating, by the one or more hardware processors, a ground truth trajectory using the processed occupancy map and the received trajectory mask, wherein the generation of the ground truth trajectory is based on a rapidly exploring random tree (RRT) star technique;
training a trajectory proposal network (TPNet), using a multiple choice learning technique, based on the generated ground truth trajectories, wherein
the multiple choice learning technique includes a set of loss functions,
the TPNet is further trained, using deep supervision, by computing a specific Trajectory Diversity Loss at two different levels of the TPNet,
the two different levels include a first level and a second level,
the first level corresponds to an outermost layer of the TPNet, and
the second level corresponds to a level immediately after an outermost decoder layer of the TPNet;
predicting, by the one or more hardware processors, a set of diverse traversable regions for the autonomous navigation system of the plurality of autonomous navigation systems using the TPNet, wherein
the set of loss functions includes a trajectory diversity loss (Ltd), and
the trajectory diversity loss (Ltd) is computed based on a weighted entropy loss between the ground truth trajectory and associated trajectory output;
identifying, by the one or more hardware processors, a goal point for each of the set of diverse traversable regions based on a goal identification technique, wherein the goal point is a final co-ordinate position among a plurality of co-ordinate positions to be reached by the autonomous navigation system in a current map,
the current map is a real time map received by the autonomous navigation system,
the autonomous navigation system is in a specific co-ordinate position of the plurality of co-ordinate positions in the current map;
identifying, using the goal identification technique, a specific probability co-ordinate position in a diverse traversable region of the set of diverse traversable regions, wherein
the specific probability co-ordinate position is greater than a pre-defined threshold, and
the specific probability co-ordinate position is farthest from the specific co-ordinate position of the autonomous navigation system in the current map;
generating, by the one or more hardware processors, a set of ground truth waypoints for each of the set of diverse traversable regions, wherein
the set of ground truth waypoints is between the goal point and the specific co-ordinate position of the autonomous navigation system in the current map, and
the set of ground truth waypoints is generated using a rapidly exploring random tree (RRT star) technique;
predicting, by the one or more hardware processors, a set of trajectory waypoints for each of the set of diverse traversable regions to obtain a set of diverse trajectories using a trajectory sampler network (TSNet), wherein
the TSNet is a specific Convolutional Neural Network (CNN)—a Long Short Term Memory (LSTM) network trained using the set of diverse traversable regions and the set of ground truth waypoints, and
the set of trajectory waypoints is a set of co-ordinate positions along the set of diverse trajectories; and
displaying the set of diverse trajectories along with associated set of trajectory waypoints.

2. The method of claim 1, wherein the occupancy map includes a set of occupied space (O1), a set of free space (O2), and a specific set of unknown space (O3).

3. The method of claim 1, wherein the plurality of sensors includes a laser scanner, a sonar, and a multi-camera system.

4. The method of claim 1, wherein a discrete occupancy grid map is based on a discretization bayesian map, a dempster-shafer map and a fuzzy map.

5. The method of claim 1, wherein the set of loss functions further includes an obstacle avoidance loss (Lobs).

6. The method of claim 5, wherein
the obstacle avoidance loss (Lobs) penalizes the TPNet for every traversable region prediction that intersects with an obstacle, and
the obstacle avoidance loss (Lobs) is predicted by minimizing a negative log likelihood of a trajectories at an obstacle location.

7. The method of claim 1, wherein
the trajectory diversity loss (Ltd) enables the TPNet to predict the set of diverse traversable regions.

8. The method of claim 1, wherein the autonomous navigation system includes a robot, a self-driven car, and a drone.

9. A system for a hierarchical network based diverse trajectory proposal for a plurality of autonomous navigation systems, comprising:
a memory storing instructions;
one or more Input/Output (I/O) interfaces; and
one or more hardware processors coupled to the memory via the one or more I/O interfaces, wherein the one or more hardware processors are configured by the instructions to:
receive input sensor data wherein
the input sensor data is received from a plurality of sensors, and
the trajectory mask is a set of grid cells occupied during a navigation track history of the plurality of autonomous navigation systems;
pre-process the input sensor data to obtain an occupancy map based on a mapping technique, wherein
the mapping technique is based on a discrete 2D occupancy grid map technique,
the occupancy map is an intermediate representation of the input sensor data, and
the pre-processing further includes:
transforming a history of an autonomous navigation system of the plurality of autonomous navigation system to an autonomous navigation system coordinate frame; and
discretizing the autonomous navigation system coordinate frame to form a grid;
process the occupancy map to obtain a plurality of binary masks, wherein
the obtained plurality of binary masks is suitable for training a Convolution Neural Network (CNN),
the processed occupancy map includes at least three mutually exclusive binary masks of the plurality of binary masks;
generate a ground truth trajectory using the processed occupancy map and the received trajectory mask, wherein the generation of the ground truth trajectory is based on a rapidly exploring random tree (RRT) technique;
train a trajectory proposal network (TPNet), using a multiple choice learning technique, based on the generated ground truth trajectories, wherein
the multiple choice learning technique includes a set of loss functions,
the TPNet is further trained, using deep supervision, by computing a specific Trajectory Diversity Loss at two different levels of the TPNet,
the two different levels include a first level and a second level,
the first level corresponds to an outermost layer of the TPNet, and
the second level corresponds to a level immediately after an outermost decoder layer of the TPNet;
predict a set of diverse traversable regions for the autonomous navigation system of the plurality of autonomous navigation systems using the TPNet, wherein
the set of loss functions includes a trajectory diversity loss (Ltd), and
the trajectory diversity loss (Ltd) is computed based on a weighted entropy loss between the ground truth trajectory and associated trajectory output;
identify a goal point for each of the set of diverse traversable regions based on a goal identification technique, wherein
the goal point is a final co-ordinate position among a plurality of co-ordinate positions to be reached by the autonomous navigation system in the current map,
the current map is a real time map received by the autonomous navigation system, the autonomous navigation system is in a specific co-ordinate position of the plurality of co-ordinate positions in the current map;
identifying, using the goal identification technique, a specific probability co-ordinate position in a diverse traversable region of the set of diverse traversable regions, wherein
the specific probability co-ordinate position is greater than a pre-defined threshold, and
the specific probability co-ordinate position is farthest from the specific co-ordinate position of the autonomous navigation system in the current map
generate a set of ground truth waypoints for each of the set of diverse traversable regions, wherein
the set of ground truth waypoints is between the goal point and the specific co-ordinate position of the autonomous navigation system in the current map, and
the set of ground truth waypoints is generated using a rapidly exploring random tree (RRT) star technique;
predict a set of trajectory waypoints for each of the set of diverse traversable regions to obtain a set of diverse trajectories using a trajectory sampler network (TSNet), wherein
the TSNet is a specific Convolutional Neural Network (CNN)—a Long Short Term Memory (LSTM) network trained using the set of diverse traversable regions and the set of ground truth waypoints, and
the set of trajectory waypoints is a set of co-ordinate positions along the set of diverse trajectories; and
display the set of diverse trajectories along with associated set of trajectory waypoints.

10. The system of claim 9, wherein the set of loss functions further an obstacle avoidance loss (Lobs).

11. The system of claim 10, wherein
the obstacle avoidance loss (Lobs) penalizes the TPNet for every traversable region prediction that intersects with an obstacle, and
the obstacle avoidance loss (Lobs) is predicted by minimizing a negative log likelihood of a trajectories at an obstacle location.

12. The system of claim 9, wherein the trajectory diversity loss (Ltd) enables the TPNet to predict diverse set of traversable regions.

13. A non-transitory computer-readable medium having embodied thereon a computer readable program for a hierarchical network based diverse trajectory proposal for a plurality of autonomous navigation systems, wherein the computer readable program, when executed by one or more hardware processors, cause:
receiving input sensor data and a trajectory mask, by one or more hardware processors, wherein
the input sensor data is received from a plurality of sensors, and
the trajectory mask is a set of grid cells occupied during a navigation track history of the plurality of autonomous navigation systems;
pre-processing the input sensor data, by one or more hardware processors, to obtain an occupancy map based on a mapping technique, wherein
the mapping technique is based on a discrete 2D occupancy grid map technique,
the occupancy map is an intermediate representation of the input sensor data, and
the pre-processing further includes:
transforming a history of an autonomous navigation system of the plurality of autonomous navigation system to an autonomous navigation system coordinate frame; and
discretizing the autonomous navigation system coordinate frame to form a grid;
processing the occupancy map to obtain a plurality of binary masks, wherein
the obtained plurality of binary masks is suitable for training a Convolution Neural Network (CNN),
the processed occupancy map includes at least three mutually exclusive binary masks of the plurality of binary masks;
generating, by the one or more hardware processors, a ground truth trajectory using the processed occupancy map and the received trajectory mask wherein the generation of the ground truth trajectory is based on a rapidly exploring random tree (RRT) star technique;
training a trajectory proposal network (TPNet), using a multiple choice learning technique, based on the generated ground truth trajectories, wherein
the multiple choice learning technique includes a set of loss functions,
the TPNet is further trained, using deep supervision, by computing a specific Trajectory Diversity Loss at two different levels of the TPNet,
the two different levels include a first level and a second level,
the first level corresponds to an outermost layer of the TPNet, and
the second level corresponds to a level immediately after an outermost decoder layer of the TPNet;
predicting, by the one or more hardware processors, a set of diverse traversable regions for the autonomous navigation system of the plurality of autonomous navigation systems using the TPNet, wherein
the set of loss functions includes a trajectory diversity loss (Ltd), and
the trajectory diversity loss (Ltd) is computed based on a weighted entropy loss between the ground truth trajectory and associated trajectory output;
identifying, by the one or more hardware processors, a goal point for each of the set of diverse traversable regions based on a goal identification technique, wherein
the goal point is a final co-ordinate position among a plurality of co-ordinate positions to be reached by the autonomous navigation system in a current map,
the current map is a real time map received by the autonomous navigation system,
the autonomous navigation system is in a specific co-ordinate position of the plurality of co-ordinate positions in the current map;
identifying, using the goal identification technique, a specific probability co-ordinate position in a diverse traversable region of the set of diverse traversable regions, wherein
the specific probability co-ordinate position is greater than a pre-defined threshold, and
the specific probability co-ordinate position is farthest from the specific co-ordinate position of the autonomous navigation system in the current map;
generating, by the one or more hardware processors, a set of ground truth waypoints for each of the set of diverse traversable regions, wherein the set of ground truth waypoints is between the goal point and the specific co-ordinate position of the autonomous navigation system in the current map, the set of ground truth waypoints is generated using a rapidly exploring random tree (RRT star) technique;

predicting, by the one or more hardware processors, a set of trajectory waypoints for each of the set of diverse traversable regions to obtain a set of diverse trajectories using a trajectory sampler network (TSNet), wherein the TSNet is a specific Convolutional Neural Network (CNN)—a Long Short Term Memory (LSTM) network trained using the set of diverse traversable regions and the set of ground truth waypoints, and the set of trajectory waypoints is a set of co-ordinate positions along the set of diverse trajectories; and displaying the set of diverse trajectories along with associated set of trajectory waypoints.

* * * * *